United States Patent [19]

Schultz et al.

[11] Patent Number: 5,656,923
[45] Date of Patent: Aug. 12, 1997

[54] A DC POWER SUPPLY CONTROLLER

[75] Inventors: Aaron M. Schultz, Cambridge; Steven B. Leeb, Belmont; Ahmed Mitwalli, Cambridge; George C. Varghese, Newton, all of Mass.

[73] Assignee: The Whitaker Corporation, Wilmington, Del.

[21] Appl. No.: 419,271

[22] Filed: Apr. 10, 1995

[51] Int. Cl.[6] .................................. G05F 1/70; H02J 7/00
[52] U.S. Cl. .......................... 323/207; 363/79; 320/32
[58] Field of Search ................................. 363/79, 80, 81, 363/89, 126, 127; 323/207, 222; 320/20, 21, 32, 23, 35, 39, 40, 52

[56] References Cited

U.S. PATENT DOCUMENTS

| | | | |
|---|---|---|---|
| 3,890,556 | 6/1975 | Melling et al. | 320/21 |
| 4,081,739 | 3/1978 | Gahler | 320/32 |
| 4,146,825 | 3/1979 | Harhay | 320/23 |
| 4,472,672 | 9/1984 | Pacholok | 320/21 |
| 4,695,784 | 9/1987 | Reynolds | 320/32 |
| 4,761,725 | 8/1988 | Henze | 363/46 |
| 4,843,299 | 6/1989 | Hutchings | 320/31 |
| 4,940,929 | 7/1990 | Williams | 323/222 |
| 5,006,975 | 4/1991 | Neufeld | 363/80 |
| 5,157,319 | 10/1992 | Klontz et al. | 320/2 |
| 5,157,320 | 10/1992 | Kuriloff | 320/39 |
| 5,175,485 | 12/1992 | Joo | 320/32 |
| 5,204,611 | 4/1993 | Nor et al. | 320/21 |
| 5,241,258 | 8/1993 | Cheon | 320/23 |
| 5,254,932 | 10/1993 | Bittar et al. | 320/23 |
| 5,307,001 | 4/1994 | Heavey | 320/30 |
| 5,396,163 | 3/1995 | Nor et al. | 320/21 |
| 5,465,039 | 11/1995 | Narita et al. | 320/32 |
| 5,493,199 | 2/1996 | Koenck et al. | 320/35 |
| 5,532,918 | 7/1996 | Mayrand et al. | 363/89 |

FOREIGN PATENT DOCUMENTS

| | | | |
|---|---|---|---|
| 0663713A1 | 1/1995 | European Pat. Off. | H02J 3/18 |
| 2693321 | 7/1992 | France | H02J 7/10 |
| 3-230759 | 4/1991 | Japan . | |
| WO92/12475 | 7/1992 | WIPO | G05F 1/40 |
| WO93/21683 | 10/1993 | WIPO | H02M 3/335 |

OTHER PUBLICATIONS

"A Digital Controller For A Unity Power Factor Converter"; Ahmed Mitwalli; 154 pages; Thesis at Masachusetts Institute of Technology; Jan. 1993.

*Principles of Power Electronics;* "Digital Control"; John G. Kassakian, et al.; pp. 395–399; 1991.

*APEC '95 Tenth Annual Applied Power Electronics Conference and Exposition,* vol. 2, Mar. 5–9, 1995; Dallas, TE, USA; pp. 647–653; XP 000528079; Rajagopalan et al.; "High Performance Control of Single–phase Factor Correciton Circuits using a Discrete Time Domain Control Method".

*Proceedings of the IECON'93,* vol. 2, Nov. 5–19, 1993; Hawaii; pp. 1027–1032, XP 000428197; Wall et al.; "Fast Controller Design for Practical Power–factor Correction Systems".

*Primary Examiner*—Peter S. Wong
*Assistant Examiner*—Adolf Berhane

[57] ABSTRACT

A large signal, linear, digital, unity power-factor controller for controlling a power supply is disclosed. The power supply controller includes a voltage controller and a current controller. The voltage controller is a feed forward and proportional-integral type of controller. By determining the control command of the voltage controller as a function of the feed forward load power, the power term in the state equations for the voltage controller is eliminated. As such, the current controller operates in time domain in such a way that the voltage controller appears as a unit time delay to the current controller. The load is a battery incorporated within an electrically-powered vehicle. The controller operates to charge the battery. The connection between the battery and the power supply being controlled is an inductive coupling.

16 Claims, 14 Drawing Sheets

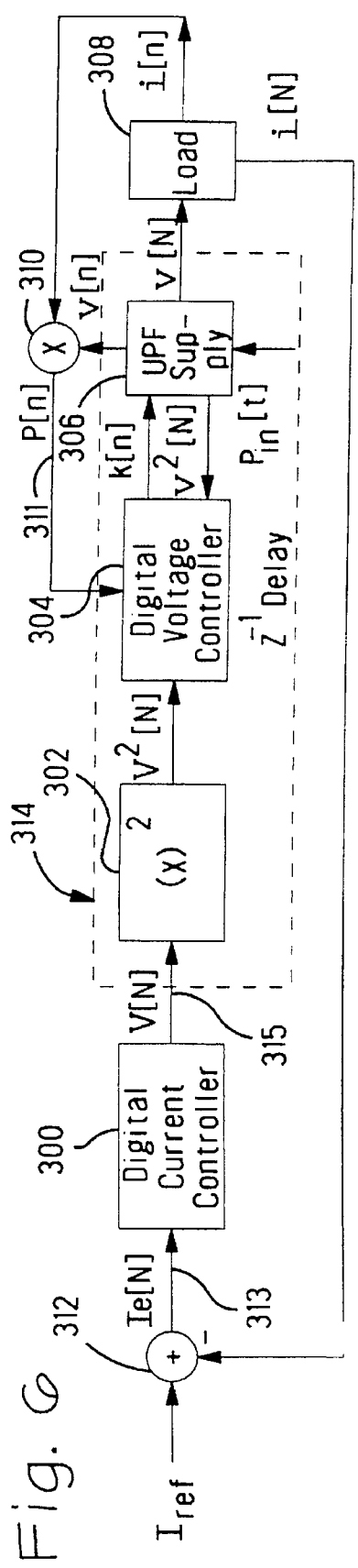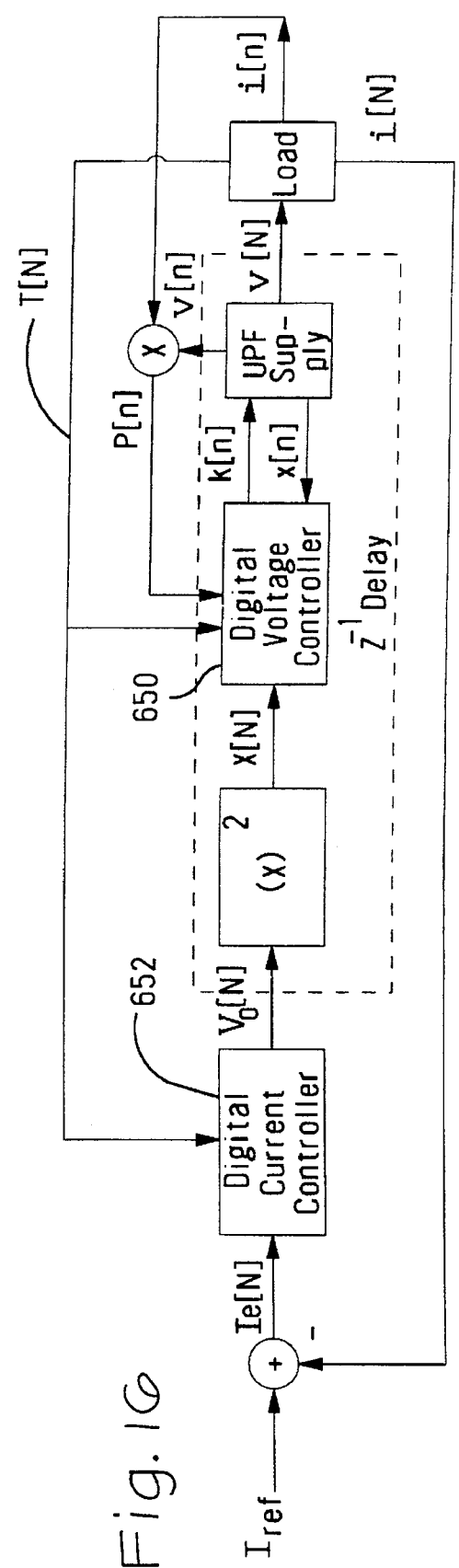

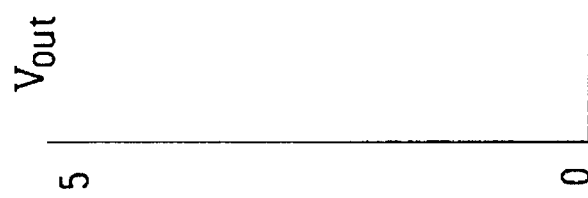
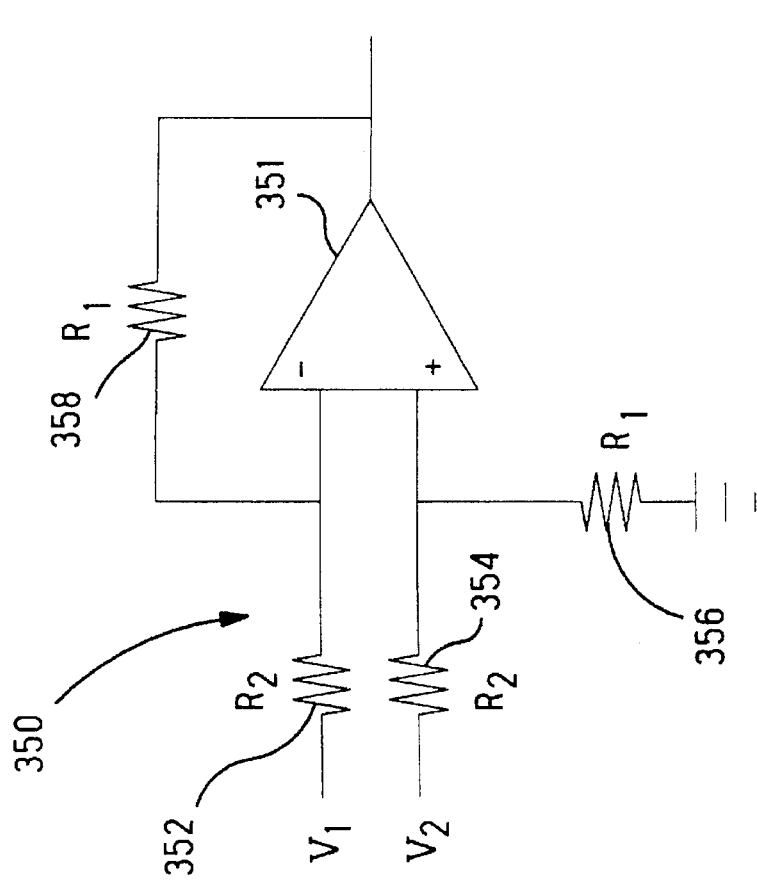
Fig. 7A
Fig. 7B
$V_{out} = (R_2/R_1) \times (V_2 - V_1)$ $V_{out} = -V_{ref}(A1/2 + A2/4 + \ldots + A10/1024)$
$A_n = 1$ if $n^{th}$ digital input is high.
$A_n = 0$ if $n^{th}$ digital input is low.

A DC POWER SUPPLY CONTROLLER

FIELD OF THE INVENTION

The present invention relates to a large signal linear digital substantially unity power-factor controller for controlling a power supply. The power supply is being controlled to re-charge a battery, in particular, a battery in an electric car.

DESCRIPTION OF RELEVANT ART

FIG. 1 depicts a prior art system 8 for charging the battery of an electric vehicle. A utility/charging station 8 is inductively coupled 18, and capacitively coupled 26, to an electric vehicle 20. The utility/charging station 10 includes an electric utility interface 14, a primary side full-bridge 16, and a communications receiver 28. The electric vehicle 20 includes rectifier circuitry and battery rack 22, as well as a communications transmitter 24. The primary side full-bridge 16 is connected to the rectifier circuitry and battery pack 22 via the inductive coupling 18. The communication transmitter 24 is connected to the communication receiver 28 via capacitive coupling 26. The charging system 8 is also referred to as a contactless charging system, an example of which is U.S. Pat. No. 5,157,319 to Klontz et al.

In the charging system 8, a high frequency inverter 16 impresses an AC signal, developed from the output of the DC power supply 14, across the primary side of a two part high frequency transformer. The primary side 16 of the charging transformer remains outside the vehicle, and mates with a secondary side 22 installed in the vehicle. The two transformer halves are inductively coupled 18. This arrangement enhances the safety and reliability of the charging system in comparison to chargers that employ conventional ohmic contacts. The design of the high frequency transformer 16 reflects the inverse relationship between transformer size and signal frequency for constant power delivery. A wireless communication system uses the capacitive coupling 26 to transmit feedback signals representing, most commonly, the output voltage and output current from the battery load. These feedback signals can also include the ambient temperature near the battery or the internal temperature of the battery, or the internal pressure of the battery, i.e., any measurable parameter of the battery. The transmission is from the transmitter 24 in the vehicle to the receiver 28 in the utility/charging station 18 outside the vehicle.

The power factor, $k_p$, of a two-terminal network is defined as the ratio of the average power measured at the terminals to the product of the rms values of the terminal voltage and current.

$$k_p = \frac{<p(t)>}{V_{rms}I_{rms}} = \frac{<p(t)>}{S}$$

$<p(t)>$ is known as real power and is measured in watts, and S is known as apparent power and is measured in volt-amperes. The optimal value for the power factor $k_p$ is unity, indicating that the source is delivering all of its power to the load.

In an AC system, for example as supplied from the local power company, the voltage and current are typically periodic waveforms in time, and the measured power is the product of these waveforms over a cycle. In order for the product of the rms values of the voltage and current to equal the measured power and yield a unity power factor, the two waveforms need to coincide in shape and phase.

To understand this better, we consider as an example an ac system with a single harmonic voltage and a distorted current. The standard utility voltage supply is nominally a sinusoidal waveform:

$$v(t) = V_\zeta \sin \omega t$$

Assuming a port with periodic current i (t):

$$i(t) = \sum_{n=0}^{\infty} I_n \sin(n\omega t + \theta_n) = I_1 \sin(\omega t + \theta_1) + \sum_{|n|\neq 1} (I_n \sin n\omega t + \theta_n)$$

The average power delivered by this system is:

$$<P> = \frac{1}{T} \int_O^T v i \, dt = V_{rms} I_{1rms} \cos\theta_1 = S k_d k_\theta$$

where $k_d = I_{1rms}/I_{rms}$ and $k_\theta = \cos\theta$; $k_d$ is the distortion factor and is related to shape, i.e., harmonic content, of the waveform while $k_\theta$ is the displacement factor and is related to relative phase of the waveform. The power factor is then defined as:

$$k_p = k_d k_\theta$$

If the shapes of the voltage and current waveforms coincide, $K_d$ is unity, and if they are in phase, $k_\theta$ is unity. Hence, for a unity power factor, we need two waveforms of the same harmonic content and phase.

In the past, low power factors were mainly due to phase displacement, or a non-unity $k_\theta$. Most of the loads to which an ac power system had to provide power were linear, drawing a sinusoidal current at the same frequency as the input voltage sine wave. These loads were usually inductive, causing the current to lag the voltage in phase. The displacement factor $k_\theta$ was then less than unity, resulting in poor power factors.

Power factor correction in such a situation can be achieved simply by adding the appropriate capacitor in shunt with the load, i.e., make a phase correction. More recently, however, the power factor problem has taken on a different form.

Today, electronic devices and power supplies present a highly non-linear load to the AC source, i.e., the local power company, and therefore draw a distorted, non-sinusoidal current from, for example, a wall outlet. The most commercially abundant example of such a load, at this time, is the basic configuration of the AC-DC power converter used to supply most computers with power, namely a simple rectifier circuit with capacitive filtering. FIG. 2A shows a diagram of such a circuit and FIGS. 2B–2D depict its waveforms.

The line rectifier (a full-wave bridge of the diodes 103) adds a dc component to the input voltage 100, and the capacitor input filter 104 extracts it and supplies it to the load 106 as the waveform 120 in FIG. 2B. The capacitor 104 is replenished by the rectifier 102 at each half cycle with brief bursts of current at each voltage peak as shown by the waveform 122 in FIG. 2C. The resulting current 124 is distorted as shown. The poor power factor here is due to the distortion factor $k_d$.

The contribution to load power is made by a harmonic component of the current which is in phase with the input voltage, but heavily attenuated due to distortion. The distorted AC input current 124 causes the AC line voltage wave form 122 to be distorted as well, as indicated by the phantom portion 123 of the waveform 124. In effect, electrical noise is added to the AC line voltage 100.

This noise poses two problems. First, the load will draw less than a maximal power for the given current peak because the voltage waveform is distorted. The second problem affects others that are using the same AC line voltage. It is more difficult to achieve a unity power factor if the input Ac line voltage is distorted from the start.

Power factors in such setups as FIG. 2A may be as low as 50%. This problem is discussed, for example, in the background section of U.S. Pat. No. 5,006,975 to Neufeld. Power factor correction here involves reshaping the input current waveform, and is a much more difficult problem than adding phase to correct for displacement effects.

Most AC-DC power converters used today are based on a design similar to the one presented above, with a rectifier and an input filter. The resulting power factor is usually around 0.6, and the current waveform is distorted with higher harmonics. Most computers require only a few hundred watts and this poor power factor multiplied by the 1400 or so watts available from a standard outlet provides the necessary power. Also, most prior art computers present a small dynamic range in the power that they draw. In other words, they can be serviced adequately by small signal power supply controls.

Recent trends, however, in computers and electronic systems have resulted in an increasing demand for power factor corrected power converters. The overall number of computers (and other electronic devices that use switch-mode power supplies) has increased dramatically as a result of cost reductions, increasing level of computer literacy, and user-friendly interfaces.

This results in more power being wasted due to such poor power factors, which translates directly into utility losses, because the utility usually charges customers for real power consumed. Moreover, the increasing demand for computing power in workstations has led to an increase in workstation components and therefore in their electrical power requirements, such as a larger dynamic range in the power that they draw. As the power limits of standard electrical outlets are approached, one way to meet these new requirements is to rewire offices with nonstandard outlets. Besides incurring extra cost on the customer, this solution requires rewiring of the outlets every time the workstation is moved. A more practical solution has been to increase the power factor of the power supply.

As mentioned earlier, a poor power factor in switched power converters is usually accompanied by distorted current waveforms. The higher harmonics in these waveforms may interfere with nearby instruments, often making it necessary to add extra filtering components. Higher harmonics may also resonate and interfere with the utility's circuit protection devices, causing them to malfunction. Power factor correction through current shaping would essentially eliminate many or all of these higher harmonics. In Europe, more stringent limits on the harmonic content of power supply waveforms are already being legislated. According to the tougher standards recommended by the International Electrotechnical Commission (IEC) 555-2, power supplies rated higher than 300 watts need to incorporate some form of power factor correction.

A technique and device that attempts to draw a current with the same frequency and shape as the input voltage is shown in FIG. 3, and can be found in *Principles of Power Electronics*, Kassakian et al., Addison-Wesley Publishing Co., 1991, p. 397. FIG. 3 depicts a high-power factor AC/DC switching preregulator 150. The voltage waveform 152 and the current waveform 154 are input to the preregulator 150. The preregulator 150 includes an inductor 156 connected to a node 160. The current into the node 160 is sensed by a linear electromagnetic (LEM) current sensing module 158, such as a HALL EFFECT device. A transistor 162 and a diode 164 are each connected to the node 160. The other end of the diode 164 is connected to the node 166. A capacitor 168, the load 170 and the voltage controller 174 are connected to the node 166. The voltage controller 174 is connected to the multiplier 176. The output of the multiplier 176 is connected to the adder 178. The output of the LEM module 158 is inverted and connected to the adder 178. The output of the adder 178 is fed to the current controller 172. The current controller 172 is connected to the transistor 162. The transistor 162, the capacitor 168, and the load 170 are connected to the node 167.

The input to the preregulator is a the rectified AC voltage waveform 152. The inner (current) loop controls the source current 154 to match the shape and phase of the input voltage $v_{in}(t)$ 152 by providing a pulse-width modulated switching sequence to the transistor 162 that forces the inductor current $i_L(t)$ Of the inductor 156 towards a desired current $i_p(t)$. The desired current $i_p(t)$ is proportional to the input voltage: $i_p(t)=kv_{in}(t)$, where k is the proportionality factor. The outer (voltage) loop regulates the output voltage $V_o$ to the desired reference voltage $V_o$ by adjusting the proportionality factor k used to generate $i_p$ every line cycle.

A sampled data model for the power supply shown in FIG. 3 that arises from a power balance equation is $$x[n+1] = x[n] + \frac{T_L V^2}{C} k[n] - \frac{2T_L}{C} P \qquad (1)$$

where the state variable x[n] corresponds to the converter output voltage squared at sample time n, k is the output of the controller at time n, $T_L$ and V are the line input period and voltage, respectively, and C and P are the output bus capacitance and the power delivered to the load, respectively.

The digital voltage controller by Mitwalli (Ahmed Mitwalli, A Digital Controller for a Unity Power Factor Converter (1993), Master of Science thesis, Massachusetts Institute of Technology, hereby incorporated by reference) is shown in FIG. 4 and replaces the voltage controller 174 of FIG. 3. The Mitwalli controller computes values of k that ensure that the state variable x will be controlled to a desired value.

In FIG. 4, the Mitwalli voltage controller 200 is depicted in relation to the converter 202. The converter 202 represents the components, other than the voltage controller 174, of the high-power-factor AC/DC switching preregulator depicted in FIG. 3. The Mitwalli voltage controller 200 includes a first squarer 204 (that receives the output from the converter 202) and a second squarer 206 (that receives a reference voltage). The adder 208 receives the squared output of the squarer 206 and the inverse of the squared output of the squarer 204. The adder 208 is connected to an accumulator 210 and to a scaler 212. The accumulator 210 is connected to a scaler 214. An adder 216 receives the scaled output from each of the scalers 212 and 214. The sum from adder 216 is connected to the scaler 218. The scaled output of the scale 218 is the proportionality constant k[n], also referred to as the control command.

The Mitwalli digital controller 200 is a discrete-time version of an analog proportional-integral (PI) controller. This digital controller uses an accumulator 210 in place of an integrator. The scaled error $V^2-v^2[n]$ (output from the adder 208) is the input to the accumulator 210. A discrete-time version of a PI controller was chosen to eliminate steady state error. In the steady state, when the error goes to zero, the output of the accumulator is constant.

The accumulator obeys the state equation $$\sigma_v[n+1]=\sigma_v[n]+(X[n]-x[n]). \quad (2)$$

Computing the control command k by $$k[n] = \frac{C}{T_L V^2} (h_1(x[n] - x[n]) + h_2\sigma_v[n]) \quad (3)$$

leads to the state space formulation for the voltage control:

$$\begin{bmatrix} \sigma_v[n+1] \\ x[n+1] \end{bmatrix} = \begin{bmatrix} 1 & -1 \\ h_2 & (1-h_1) \end{bmatrix} \begin{bmatrix} \sigma_v[n] \\ x[n] \end{bmatrix} + \begin{bmatrix} 1 \\ h_1 \end{bmatrix} X[n] + \begin{bmatrix} 0 \\ -\frac{2T_L}{C} \end{bmatrix} P[n] \quad (4)$$

As reflected by equation (3), the Mitwalli controller uses an estimate of capacitance C to calculate the control command k[n]. The capacitance C is itself an estimate. In view of manufacturing tolerances and aging, for example, a precise value of C cannot be known.

The state formulation of equation (4) shows a dependence upon the power consumed by the load 170. In other words, the state equation (4) is in terms of $x[n]=v_o^2[n]$ except for the load power term, P[n]. In the circumstance where the load is a battery, it is very difficult to eliminate the load power in terms of the state variable $x[n]=v_o^2[n]$ because the battery is represented as a complicated function of output voltage and output current. Consequently, the prior art has been unable to eliminate the load power from some function of on (4) using some function of only $x[n]=v_o^2[n]$.

To deal with this problem, the Mitwalli controller considers the load power term to be negligible and approximates the state space description without using the load power term. As such, the Mitwalli controller is nonresponsive to the load power term; in this respect, it can be described as mere open-loop control relative to the load power term. Such an open-loop approach can become unstable if the effects of the load, e.g., the power demands of the battery, place the poles of the controller outside the unit circle.

Further, the Mitwalli controller is only a voltage controller; it is unable to control the current loop, i.e., it cannot close the current loop.

The Mitwalli controller is what is referred to as a "large signal" controller. The term "large signal" refers to the dynamic range of the power drawn by the load. In other words, when the power consumed by the load changes by more than what would be deemed a "small signal" range, the Mitwalli controller is able to respond. In contrast, the controllers upon which the Mitwalli controller improves were small signal controllers.

In the prior art computers that existed prior to Mitwalli's thesis, the loads serviced by a computer's power supply generally exhibited small variations in the power that they consumed. As such, the prior art was content to use cheap low power-factor controllers in the computer. Now, however, there is an increasing demand for high, preferably unity, power controllers for such applications as computers. The "small signal" approach to a power supply controller cannot deliver a high power factor for a "large signal" load. Hence, the Mitwalli controller represents a response to this need for a "large signal" controller.

When charging the battery for an electric vehicle, the need for a robust, large signal power supply controller is even greater. To charge a discharged battery, the charging profile recommended by the battery's manufacturer must be supplied to the discharge battery. Charging profiles vary greatly based upon the electro-chemical physics of the particular battery type. If the battery's recommended charging profile is not followed closely, the internal temperature of the battery can rise to damaging levels.

The U.S. government is pushing the automobile manufacturers to bring electrically-powered vehicles to the market that are convenient for the user. User convenience requires, among other things, that the battery-charging technology be fast, safe, and efficient; efficiency implies being economical. A need exists in the art for a robust, large signal controller that can deliver a recommended charging profile to the battery quickly and safely while at the same time drawing a current waveform from the local utility that closely matches, in frequency and in shape, the line voltage waveform supplied by the utility, thereby being economical via achieving a high power factor.

SUMMARY OF THE INVENTION

It is an object of the present invention to achieve a large signal, linear, digital, substantially unity power-factor controller for controlling a power supply.

It is an object of the present invention to achieve a controller that eliminates the power term from the state equations of the controller.

It is an object of the present invention to close the current loop so as to control the output current.

It is an object of the present invention to achieve a controller that can charge a wide range of battery types with minimal knowledge of the charging profile required for a particular battery or the discharge-state of that particular battery.

It is an object of the present invention to achieve a voltage controller that is operatively related to the current controller as a simple delay, thereby enabling easy adaption by the current controller to deliver a desired current to any linear, time-invariant ("LTI") load.

The objects of the present invention are fulfilled by providing a substantially unity power-factor controller for a power supply, the controller including a large signal voltage controller that incorporates feedforward of the power to the load. In particular, this large signal voltage controller computes a command to the power supply that compensates based upon the measured power to the load being supplied by the power supply. Because the voltage controller determines the command signal k as a function of sampled load power, the voltage controller is unusually robust in the presence of large signal variation loads.

This objective of providing a large signal voltage controller for controlling a power supply, the power supply supplying a load voltage and load current, is achieved by: feedback means for determining an error $\Delta s$ between a first feedback parameter s from the load and a reference value S corresponding to the first feedback parameter s; and final command means for determining a control command as a function of the error $\Delta s$ and at least one feedforward parameter.

Further objects of the present invention are fulfilled by providing a substantially unity power-factor, power supply controller that includes a current controller that operates in such a way that the voltage controller represents a simple delay to the current controller. Because the command signal is calculated by the voltage controller as a function of the feed forward term, load power P, the voltage loop dynamics are substantially independent of load.

This objective of providing a large signal substantially unity power-factor controller for controlling a power supply, the power supply supplying a load thereto, is achieved by: a large-signal feedforward voltage controller for controlling voltage output to the load; and a current controller, operatively connected to the voltage controller, for controlling current output to the load; a feedforward parameter of the voltage controller being a function of scaled power to the load.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a diagrammatic depiction of an embodiment of the substantially unitary power-factor large-signal controller of the present application;

FIG. 7(A) is a diagrammatic depiction of a resolution mapping circuit;

FIG. 7(B) is a waveform associated with the mapping circuit of FIG. 7(A);

FIG. 16 is a diagrammatic depiction of an alternative embodiment of the power controller of the present invention that controls as a function of the temperature of the load.

DETAILED DESCRIPTION OF THE PREFERRED EMBODIMENTS

Figure 4:
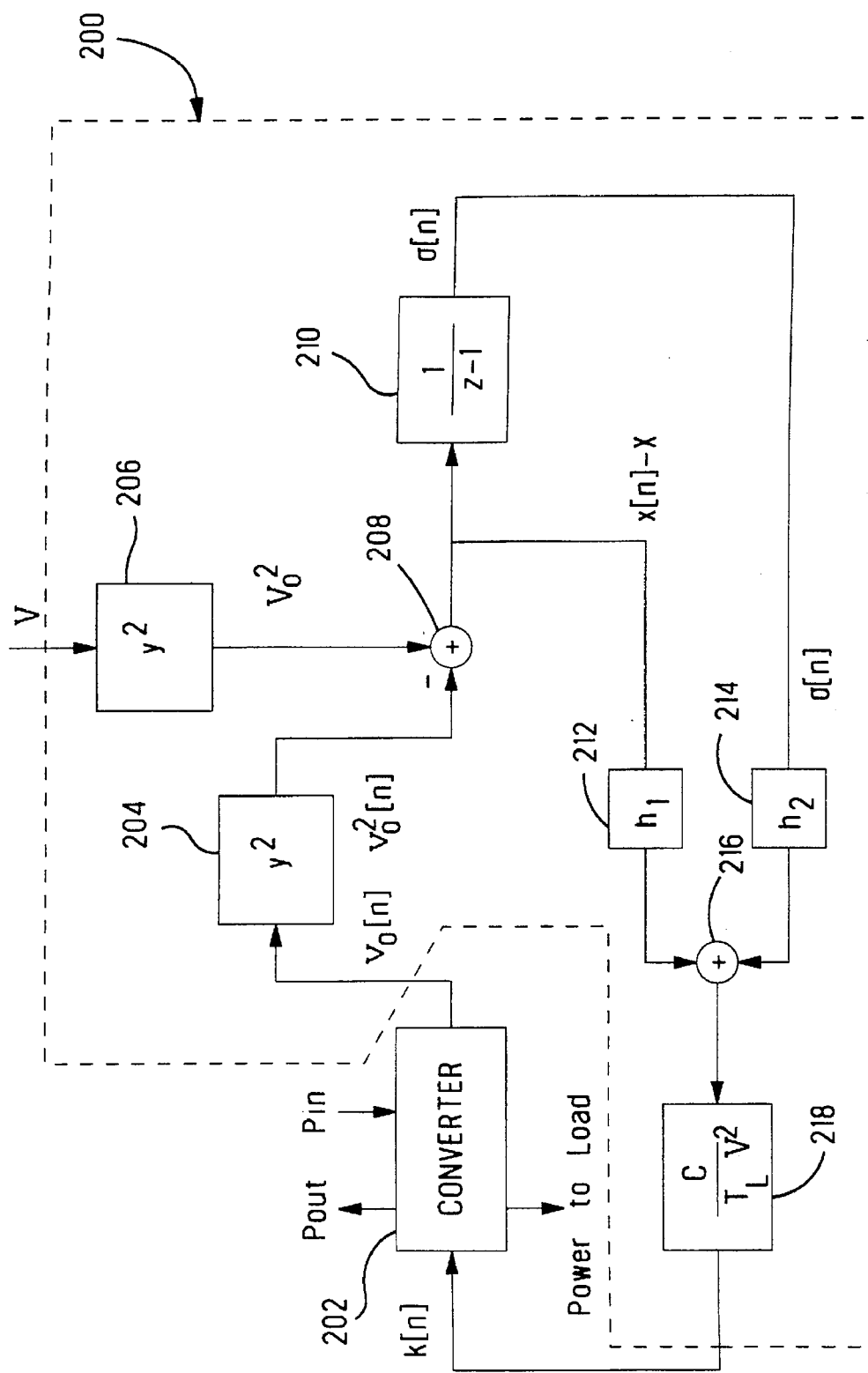
FIG. 4 is a diagrammatic depiction of a prior art variation voltage loop controller of the switching preregulator of FIG. 3.

The present embodiment improves upon the Mitwalli voltage controller of FIG. 4 via eliminating the power term from the state equations 4 by adding a compensating feed forward term, based on load power, to the control command equation 3. In the control arts, a "feedback" signal is one used to form an error signal, i.e., the difference between the feedback signal and a desired signal. In contrast, a signal that is not used to produce an error signal is referred to as a "feed forward" signal. Hence, adding a load power term to the control command equation (3) is referred to as adding a feed forward term.

Defining a new command k_tilde[n] by $$k\_tilde[n] = \tilde{k}[n]$$

$$\tilde{k}[n] = \frac{C}{T_L V_2} (h_1(X[n] - x[n]) + h_2 \sigma_v[n]) + \frac{2}{V^2} P[n] \quad (5)$$

and replacing k[n] with k_tilde[n] in the power balance equation 1 results in a new system of state equations $$\begin{bmatrix} \sigma_v[n+1] \\ x[n+1] \end{bmatrix} = \begin{bmatrix} 1 & -1 \\ h_2 & (1-h_1) \end{bmatrix} \begin{bmatrix} \sigma_v[n] \\ x[n] \end{bmatrix} + \begin{bmatrix} 1 \\ h_1 \end{bmatrix} X[n]. \quad (6)$$

The new implementation of the voltage loop samples the output current as well as the output voltage. With $P[n]=v[n]*i[n]$ available, the power term in equation 4, which depends on the output voltage and output current, is eliminated from the state transition dynamics. The controller can operate with the same gains for a wide range of loads. Power to the load is sampled, P[n], on the fly, i.e., during the operation of the power supply controller.

Figure 5:
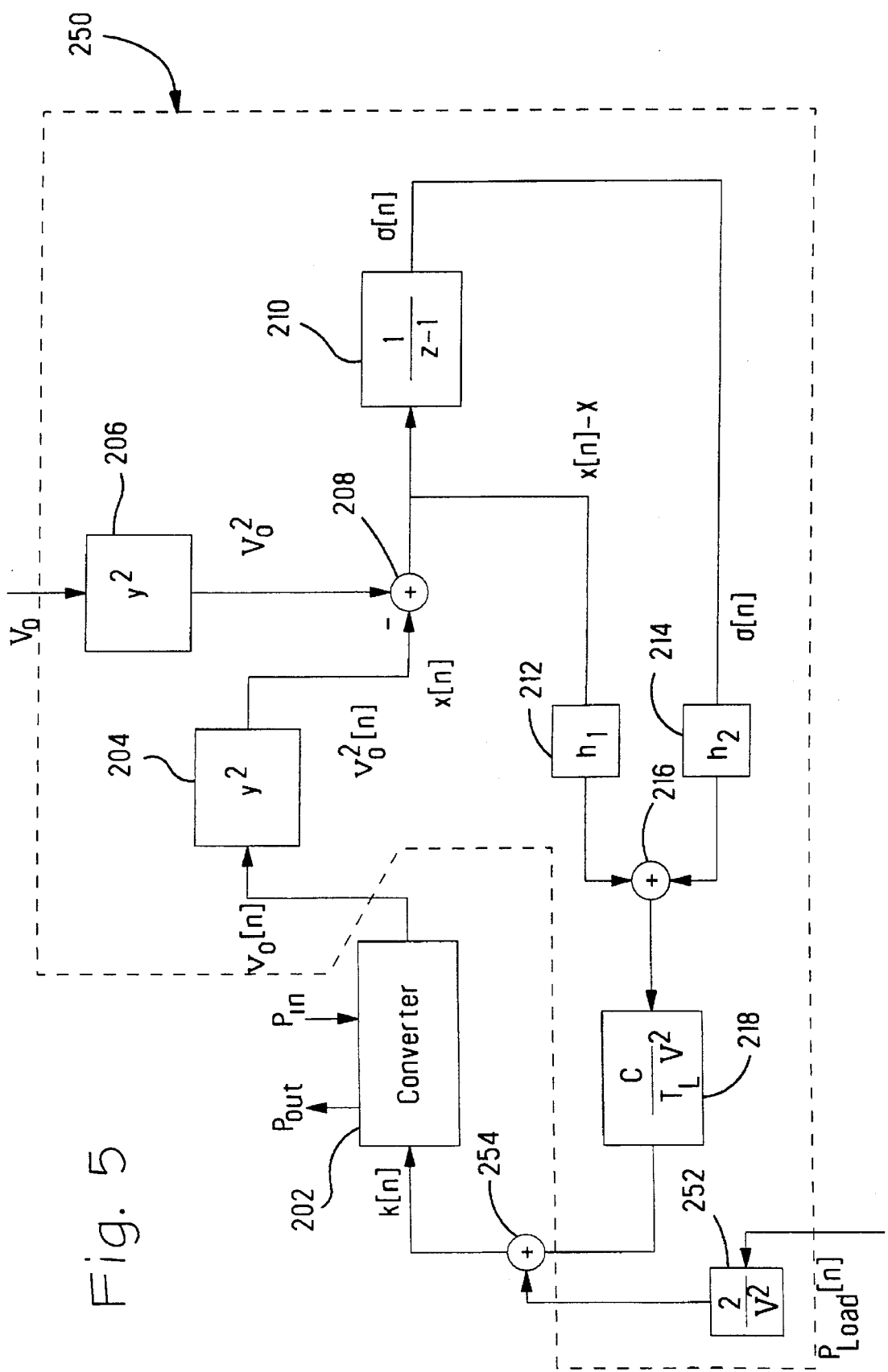
FIG. 5 is a diagrammatic depiction of an embodiment of the large-signal voltage controller of the present application.
Figure 8:
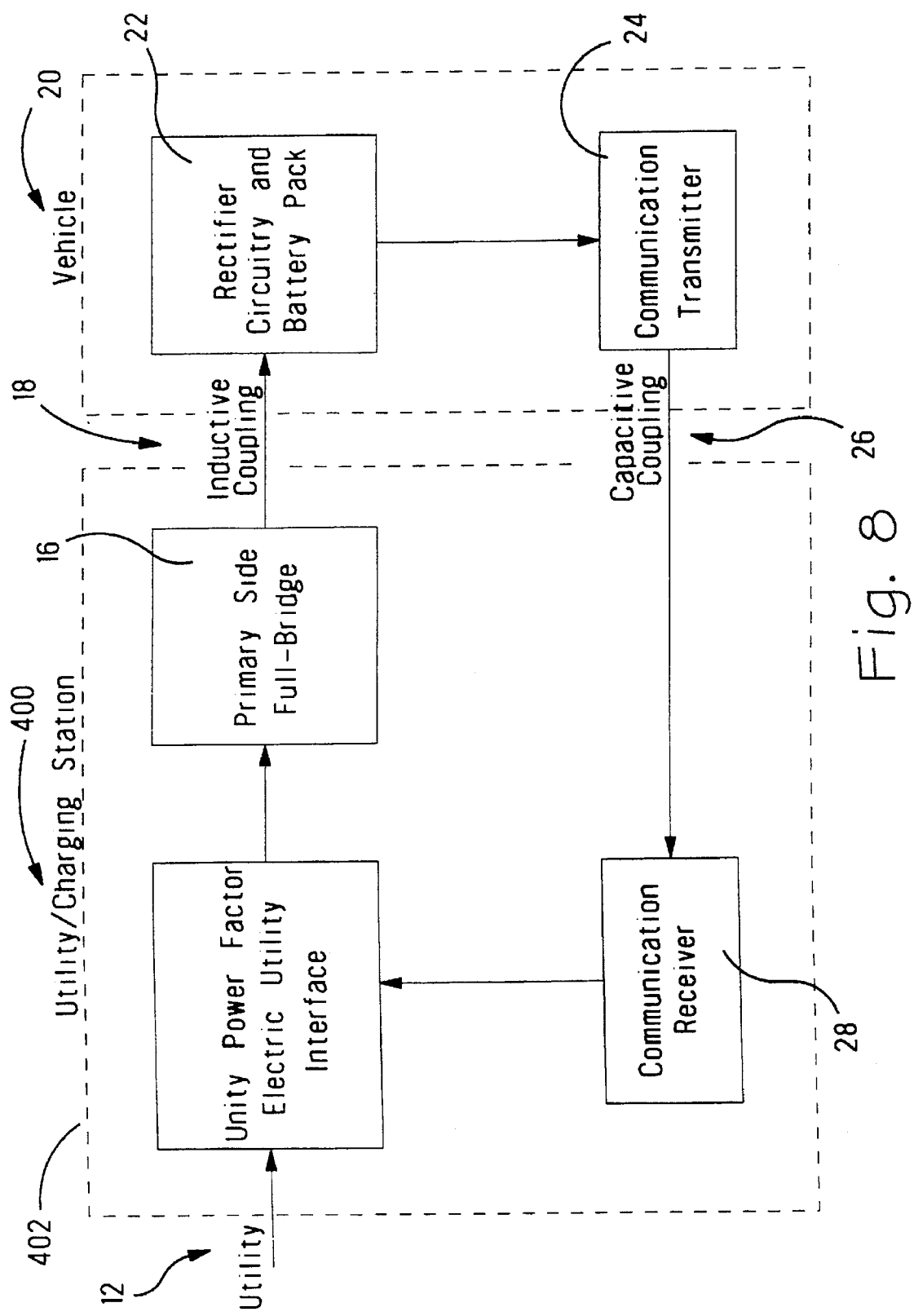
FIG. 8 is a diagrammatic depiction of an embodiment of a battery charging system of the present application.

FIG. 5 depicts a discreet-time feed forward and proportional-integral ("PI") controller 250 that implements the command k_tilde[n] equation 5. Hereafter, the k_tilde[n] designation will be used interchangeably with the designation k[n]. The description of those components shared with the Mitwalli controller 200 FIG. 4 will not be repeated. The voltage controller 250 includes an adder 254 that receives the output of the scaler 218 and the output of the scaler 252. The scaler 252 scales the sampled power to the load P[n].

FIG. 6 depicts an embodiment of the power supply controller. The load 308 is supplied with power by the power supply 306. The power supply 306 is controlled by the power supply controller, which includes the multiplier 310, the voltage controller 304, the squarer 302, the current controller 300, and the adder 312. The multiplier 310 receives samples of the load current and load voltage and outputs their product, a sample of the power to the load to the voltage controller 304. Part of the voltage controller 304 is shown separately as the squarer 302. The squarer 302 provides the reference variable $V^2[N]=X[N]$ to the voltage controller 304. The other squarer 206 of the voltage controller 304 is not depicted separately, rather the state variable $x[n]=v^2[n]$ is shown as being received from the power supply 306. In addition, the voltage controller 304 outputs the control variable k[n] to the power supply 306. The current controller 300 outputs reference voltage V[N] to the squarer 302. The adder 312 receives a sample of the current to the load and adds the inverse of that current to the reference current $I_{ref}$.

Figure 1:
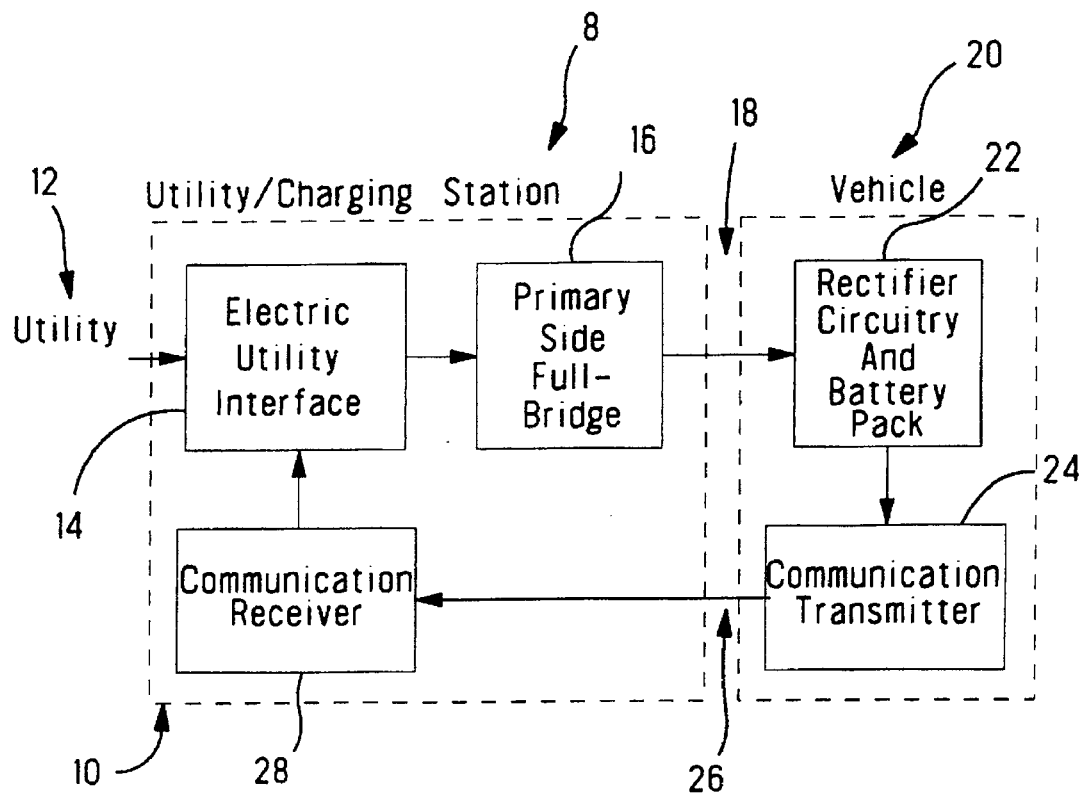
FIG. 1 is a diagrammatic depiction of a prior art battery charging system.
Figure 2A:
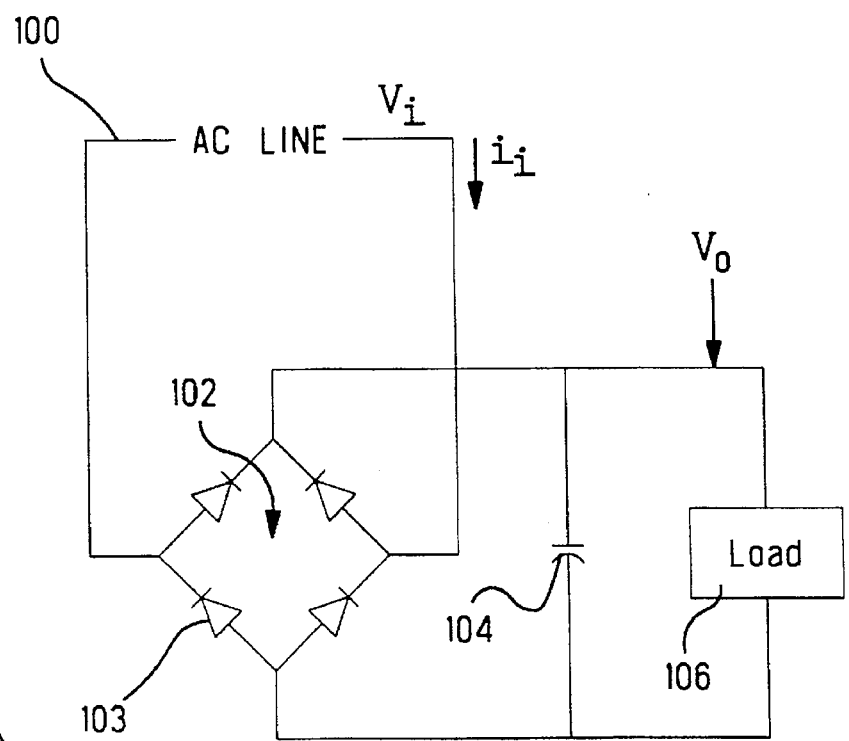
FIG. 2(A) is a diagrammatic depiction of a prior art power supply controller.
Figure 2B:
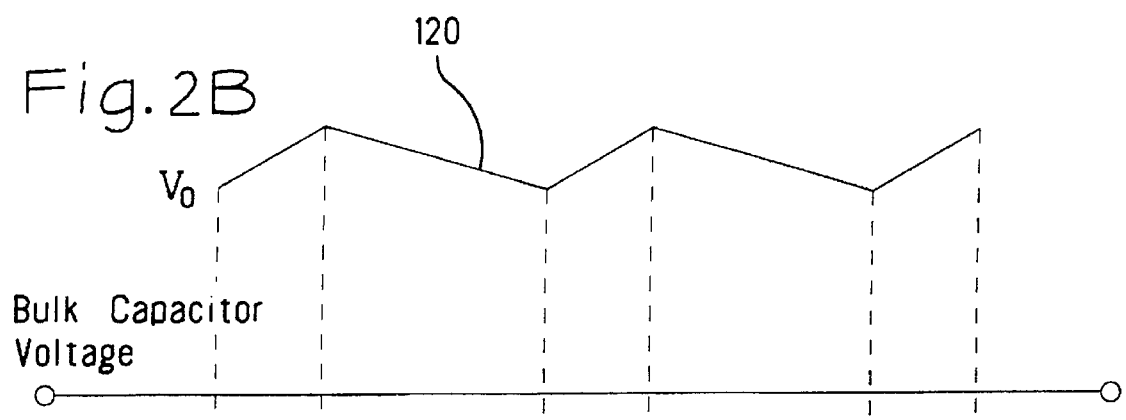
FIGS. 2(B)–2(D) depict wave forms associated with the circuitry of FIG. 2(A)
Figure 2C:
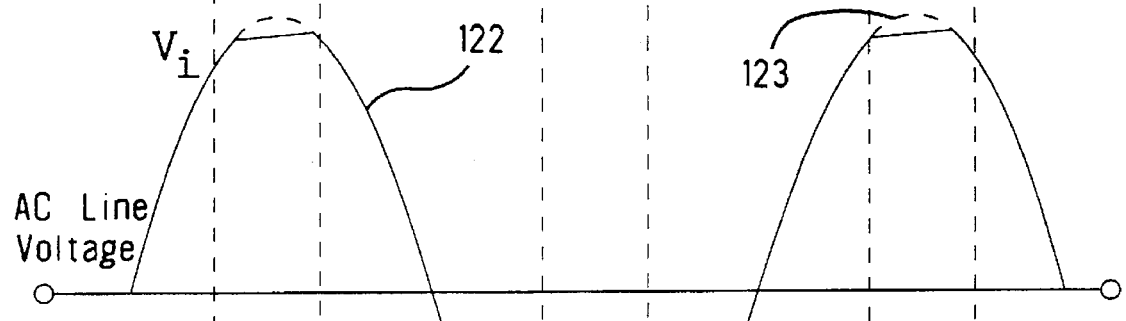
Figure 2D:
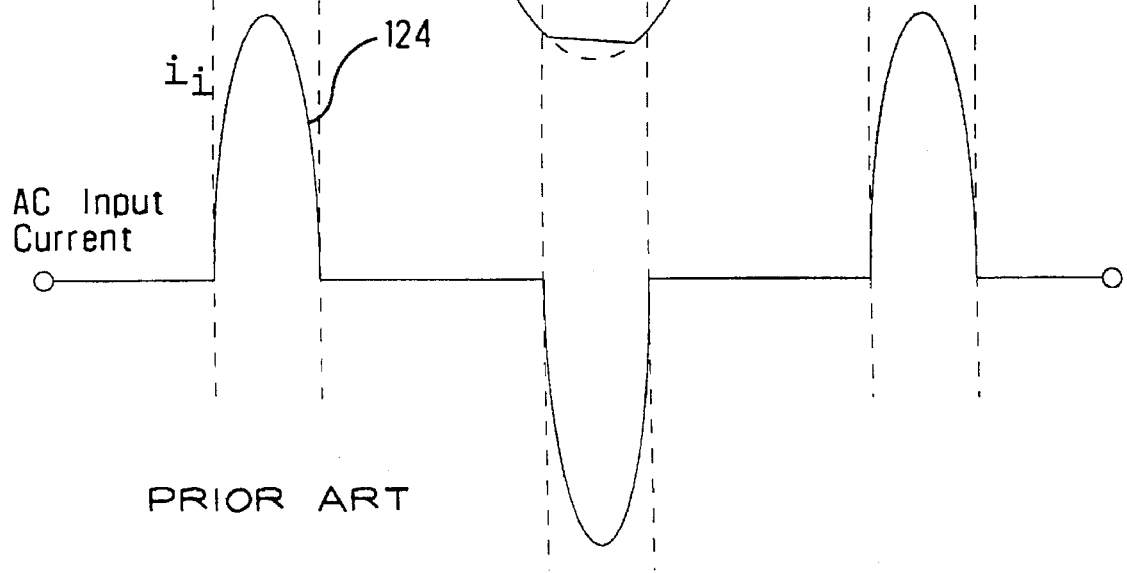
Figure 3:
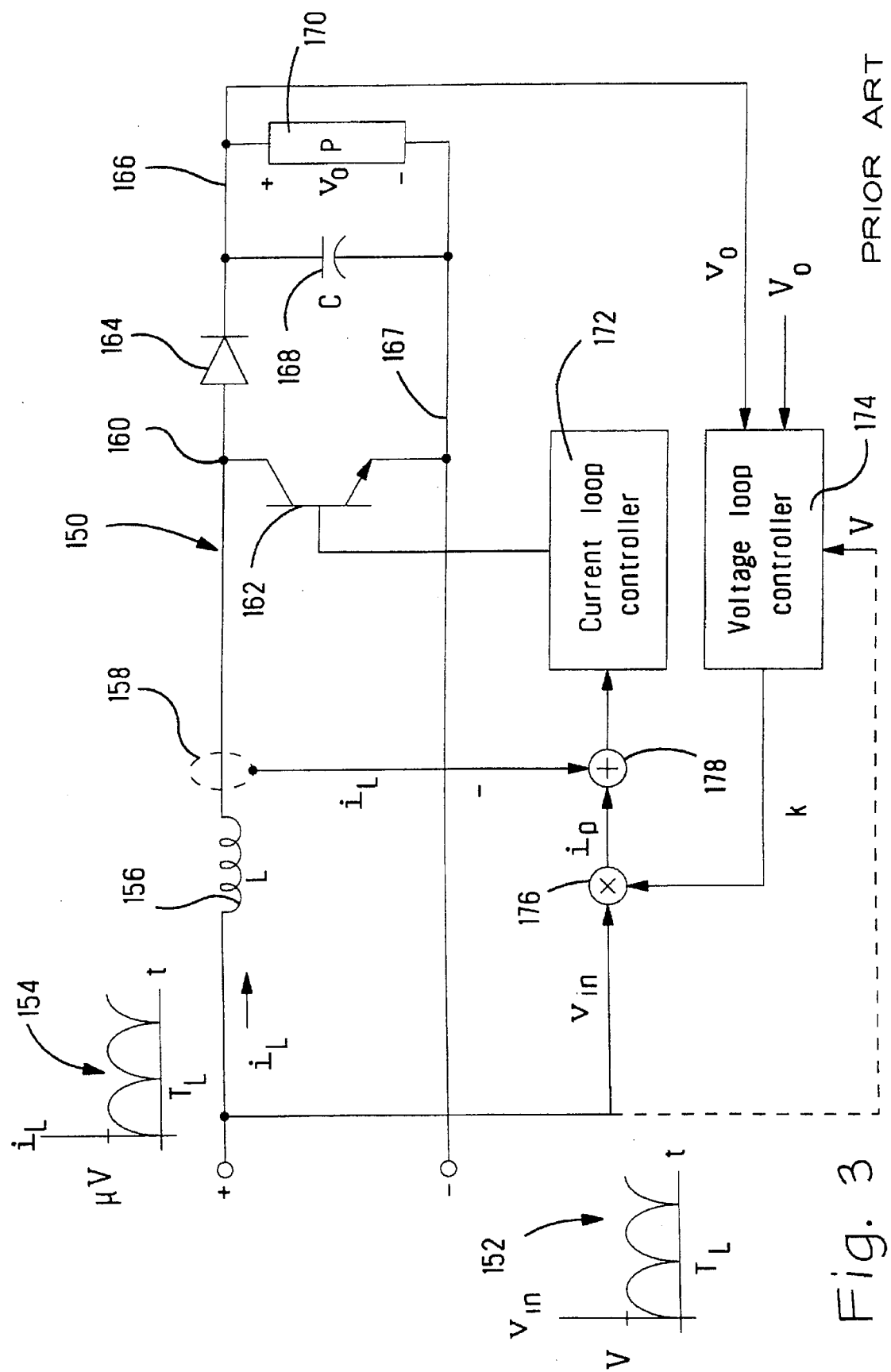
FIG. 3 is a diagrammatic depiction of a prior art high power-factor AC/DC switching preregulator.
Figure 15:
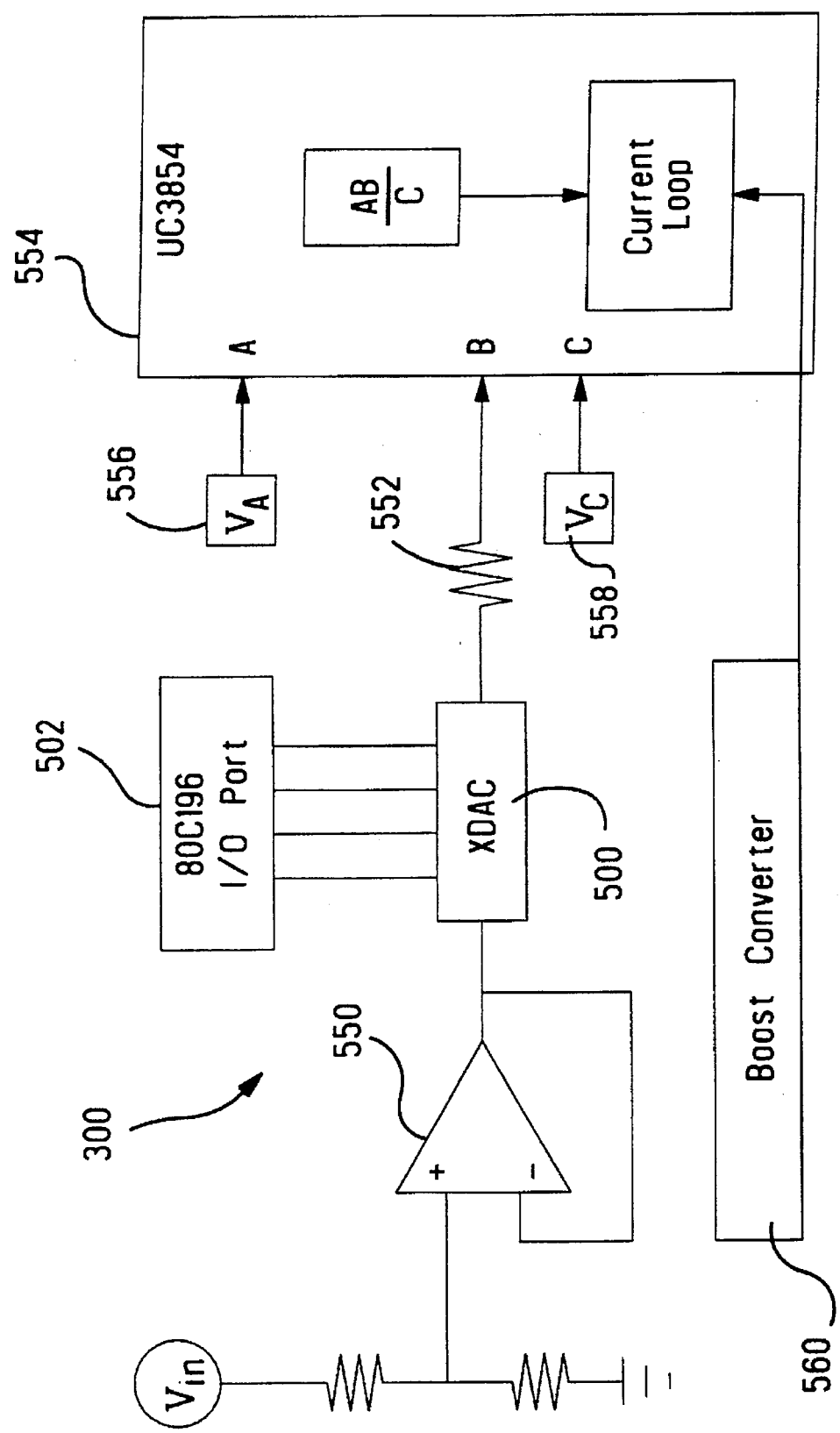
FIG. 15 is a diagrammatic depiction of an embodiment of the innermost control loop of the present invention.

There are three loops in the present embodiment. The outermost control loop is the digital current loop, as shown in FIGS. 6 and 16. It controls the output current by computing a voltage reference for the inner voltage loop. The digital inner voltage loop, shown in FIGS. 6 and 16, controls the output voltage by computing a command k[n]. The command k[n] is sent to the innermost loop, which is an analog current loop and which is shown in FIGS. 3 and 15, but is NOT shown in FIGS. 6 and 16. This innermost loop interfaces directly to the power electronics, and controls the input current (from the utility) to match the phase and waveform shape of the input voltage. The input voltage is an input to the inner most current loop.

Because the innermost current loop in the present embodiment is analog, it does not sample the input voltage. The voltage loop in the present embodiment is digital, and in fact does sample the input voltage, the output voltage, and the output current. The outermost current loop in the present embodiment is digital, and uses the samples of output voltage and current.

The outer current loop and voltage loop control the output current and output voltage, respectively; they do not control the input current. In contrast, the innermost current controls the input current, and not the output voltage or output current.

In the circumstance in which the load is a battery being charged, the reference current $I_{ref}$ is the current required by the particular battery type, as suggested by the manufacturer of the battery. Dashed box 314 depicts the operative relation between the current controller 300 and the squarer 302, the voltage controller 304, and the power supply 306: the box 314 represents a unit time delay to the current controller 300.

The voltage loop compensation produces the control signal k (equation 5) which acts as a power command for the boost converter plant. The current loop compensation 300 produces the control signal $X[N]=V^2[N]$ (equations 5 and 6) which acts as a squared voltage reference for the voltage loop. With the addition of the feed forward term 311, the voltage loop, operating at a sampled data rate of n, converges for many loads in a reasonable number of steps, Q.

The current loop 300 operates at a sampled data rate of N=Q*n. Hence, there is significance to the depiction in FIG. 6 of a current i[N] and a current i[N]. The current loop assumes the voltage loop is simply a delay 314 (Z-transform $z^{-1}$) because the voltage loop state transitions do not affect the operation of the current loop 300. The current loop 300 controls the output current i[n] and supplies the reference voltage V[N] to the squarer 302, which squares it to form the control signal $X[N]=V_o^2[N]$ for the voltage loop.

This simplification of the dynamics of the inner voltage loop 314 enables stability analysis and pole placement for the current loop and is easily within the ordinary level of skill in the art. With PI control, the reference $V_o$ is given by $$V_o[N]=h_e(I_{ref}-i[N])+h_o\sigma_i[N]. \quad (7)$$

The voltage delay model results in the state equation $$v[N+1]=V_o[N]=h_e(I_{ref}-i[N])+h_o\sigma_i[N]. \quad (8)$$

The dynamics of the accumulator 210 are described by $$\sigma_i[N+1]=\sigma_i[N]+(I[N]-i[N]). \quad (9)$$

Equations 8 and 9 are insufficient for a complete state space description of a system with a load more complex than a resistor. Step responses of linear networks can be computed, and discrete time state equations can be determined, from step invariant transforms and incorporated into the state space description. If PI and feed forward control is not enough to provide stability for a load with many states, then a different form of control can be conceived and easily evaluated by writing a new linear state transition matrix that incorporates the present control scheme and the load dynamics. Eigenvalues can be computed for new control gains to ensure stability. Again, this is within the ordinary level of skill within the art.

On startup, the error 313 in the output current is high, resulting in large voltage reference commands 315 and undesirable output current overshoot. To implement a soft startup, the reference point for the output current is stepped up slowly to its final value. A problem during startup and, in fact, during any large transient is integrator windup. Saturation corresponds to maximum current loop command $V_o$. The accumulator value may continue to increase excessively when the controller is saturated as the error term may still be negative. Undesirable overshoot may result when maximum command continues while the accumulator "unwinds." As an anti-windup mechanism, the controller stops incrementing the accumulator $\sigma_i$ when the output command $V_o$ is saturated, and also when soft startup is happening.

As long as the output current remains within a specified steady state band, then no control voltage reference is computed. The voltage reference is taken to be the average of previous control computations. When steady state command averaging is happening, then output voltage steady state band values must be computed in addition to the output voltage reference for steady state command averaging to occur within the inner voltage loop 314.

The innermost current loop in FIG. 3 is implemented using the analog current loop on the Unitrode UC3854. The implementation of the digital controller is done upon a microprocessor, for example the Intel EV80C196KB, a commercial evaluation board for the Intel's microcontroller 80C196KB which features A/D conversion.

The preferred embodiment for implementing the present invention in terms of size and speed would be a very large scale integrated ("VLSI") circuit, similar to that discussed in the Mitwalli thesis, though its cost-effectiveness is dependent upon a minimal volume of IC's being produced. For the circumstance in which the minimum volume of IC's would not be produced, a better alternative would be a dedicated microprocessor implementation, again similar to that discussed in the Mitwalli thesis. Such a dedicated microprocessor is a more efficient embodiment than the EV80C196KB test-bed because it is less flexible than a test-bed must be. Alternatively, the digital controller could be embodied by all discrete logic or analog components.

In the present embodiment, the output of the digital voltage-loop controller 304 needs to be fed to the current-loop controller 300 as an analog signal. An implementation of the system computes the commanded current $i_p$ in FIG. 3 inside the microprocessor and then converts it to an analog signal to send to the current loop controller. This requires, in addition to computing k[n], that the input voltage waveform be sampled and reconstructed by the voltage loop to provide the correct command signal k[n] to the inner current loop. The inner current loop, which is an analog loop in the present embodiment, uses the input voltage to compute the switching pattern of the transistor 162, but the current loop of the present embodiment does not sample the input voltage. This extra sampling and processing is costly in terms of microcontroller power and time.

A better embodiment utilizes a multiplying digital-to-analog converter ("DAC"). A multiplying DAC outputs a certain function of a digital and an analog input, in this case a product. It is used to replace the multiplier 176 in FIG. 3.

Figure 14:
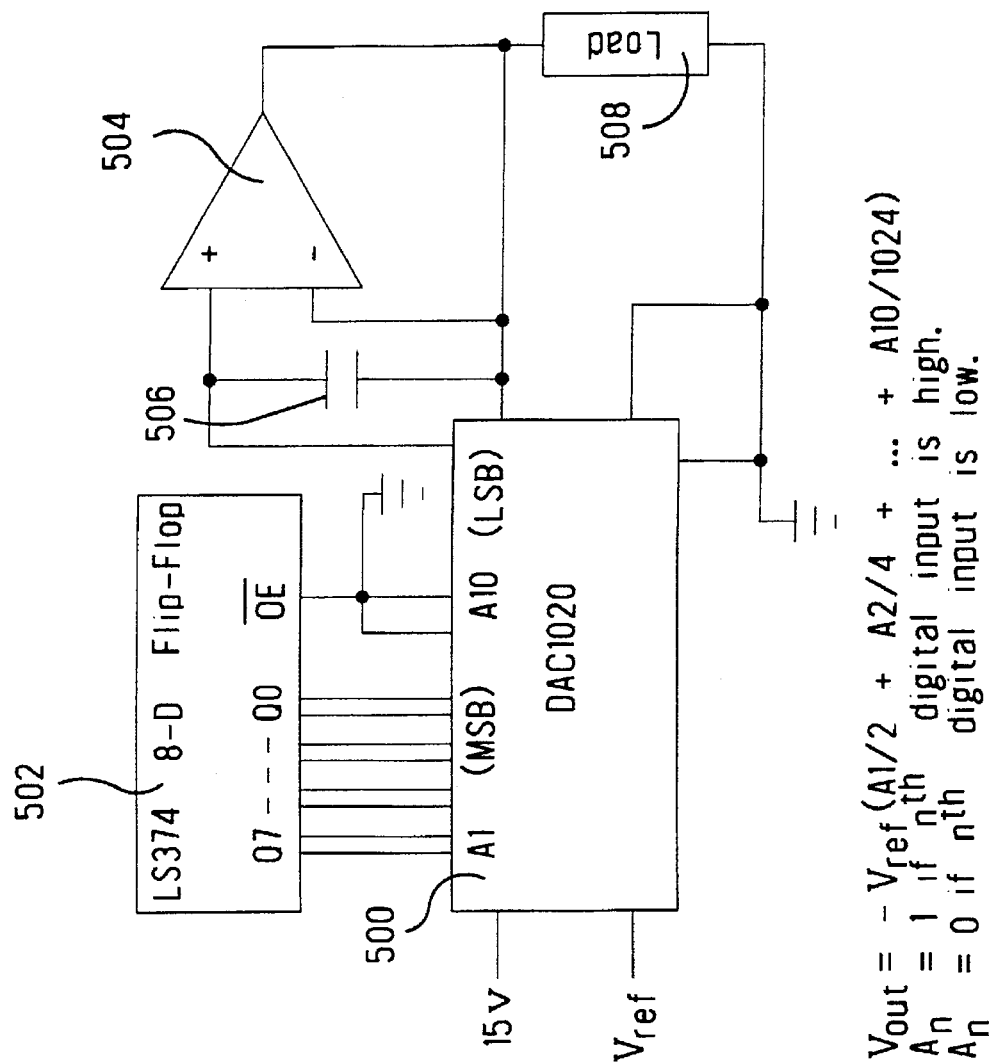
FIG. 14 is a diagrammatic depiction of the embodiment of the multiplying digital to analog converter of the present invention.

FIG. 14 illustrates an embodiment of the multiplying DAC. A latch 502 is connected to the multiplying DAC 500. The multiplying DAC 500 is connected to the load that it serves 508. In an additional connection between the multiplying DAC 500 and the load that it serves 508, there are signal conditioning components including a differential amplifier 504 and a capacitor 506. The latch at the input to the multiplying DAC is used to synchronize the signals input to the multiplying DAC.

The innermost control loop, which controls the input current to be of the same phase and have the same waveform shape as the input voltage, is implemented using the Unitrode UC3854 device, and is depicted in FIG. 15. As an alternative, it could be embodied as discrete logic, or another microprocessor, or as part of the programming of a single processor that also implements the voltage controller. The current controller 300 includes a signal conditioning amplifier 550 connected to the multiplying DAC 500. Also connected to the multiplying DAC 500 is the latch 502 of an interface device of the microprocessor. The multiplying DAC 500 is connected through a resistor 552 to the input B of the UNITRODE device 554. A fixed reference voltage 556 is connected to the input A of the UNITRODE device 554 while a fixed reference voltage 558 is connected to the input C of the UNITRODE device 554.

The UC3854 device (item 554) was designed to be used in a fully analog setting to implement both the voltage and current control loops. Three external control inputs to the chip, A, B, and C, are fed to a function block that outputs the function AB/C. This output is used as the current reference to which the input current is controlled through a current loop on the chip, as shown in FIG. 15. For a purely analog controller, one of inputs A and B of the Unitrode device 554 is made to be the input voltage waveform $v_{in}(t)$. The other of inputs A and B is made to be the scale factor k(t) derived from the output voltage error. The input C (the one in the denominator) is made proportional to the square of the input voltage rms value.

For the digital embodiment of FIG. 15, inputs A and C are fixed in value and B is chosen to be the output of the multiplying DAC 500. This setup is particularly attractive for testing and development because it allows the flexible limiting of commanded power to safe values defined by A, C, and the upper limit on B.

The A/D converter on the 80C196KB microprocessor has a 10-bit resolution. However, these bits are not all found in the same register. It therefore requires an extra read operation to get the full 10 bits. Moreover, the microprocessor can be instructed to perform an 8-bit conversion and yield a faster conversion time. However, the extra time incurred is insignificant, and the quantization effects are much less if 10 bits are read.

As it turns out, the 10-bit resolution on the A/D does not yield satisfactory results without an additional step. Because only a small portion of the range of voltages (a section around steady state) needs to be resolved for successful PI control within the limits of the control command, it is possible to increase this resolution, i.e., the resolution of the output voltage sampling process, with the resolution mapping circuit 350 in FIG. 7A. The resolution mapping current includes operational amplifier 351 and configuration resistors 352, 354, 356, and 358.

FIG. 7B shows that a small range of voltages, 270 volts to 430 volts, rather than the full range of zero to 430 volts, is mapped onto the 0–5 volt range of the A/D converter. This effectively increases resolution by a number of bits equal to $\log_2(m)$, where m is the slope of the ascending section 360 of the curve. This circuit is used in conjunction with the 10-bit A/D converter.

The resolution of the 10 bit A/D conversion is improved by restricting useful input voltages to range from approximately 270 Volts to 400 Volts. These values map to voltages on the A/D pin of the evaluation board ranging from 0 Volts to 5 Volts.

The use of fixed-point arithmetic in the microprocessor requires that many of the parameters of the system be scaled to be represented by an integer. This scaling, along with other extraneous gains associated with the current and voltage sensors, and A/D or D/A conversion, enter the loop in the transfer relation between the inputs to the controller and its outputs. The software implementation of the control algorithm compensates for these gains, is similar to the software for the Mitwalli thesis and is within the ordinary level of skill in the art.

Figure 9:
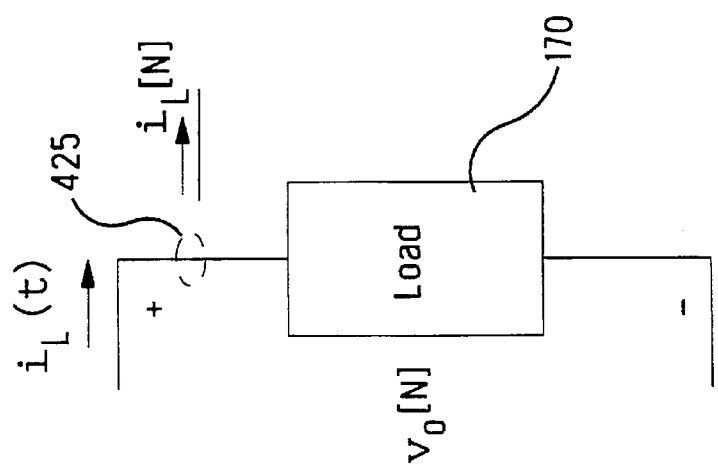
FIG. 9 is a diagrammatic depiction of an embodiment of the preferred embodiment of the load current sensing circuit of the present application.

A LEM current sensing module 425 FIG. 9 is used to develop a voltage that is linearly proportional to the output current. The device works by sensing the magnetic field created by the output current, and sending a scaled version of that current through an output resistor (not depicted). While the LEM module 425 is designed for measuring currents up to 50 Amps, it can be used of the small amperage for the prototype. To account for offset problems, an op amp adder (not depicted) circuit scales the sum of a buffered adjustable voltage and the output of the LEM module.

Figure 10:
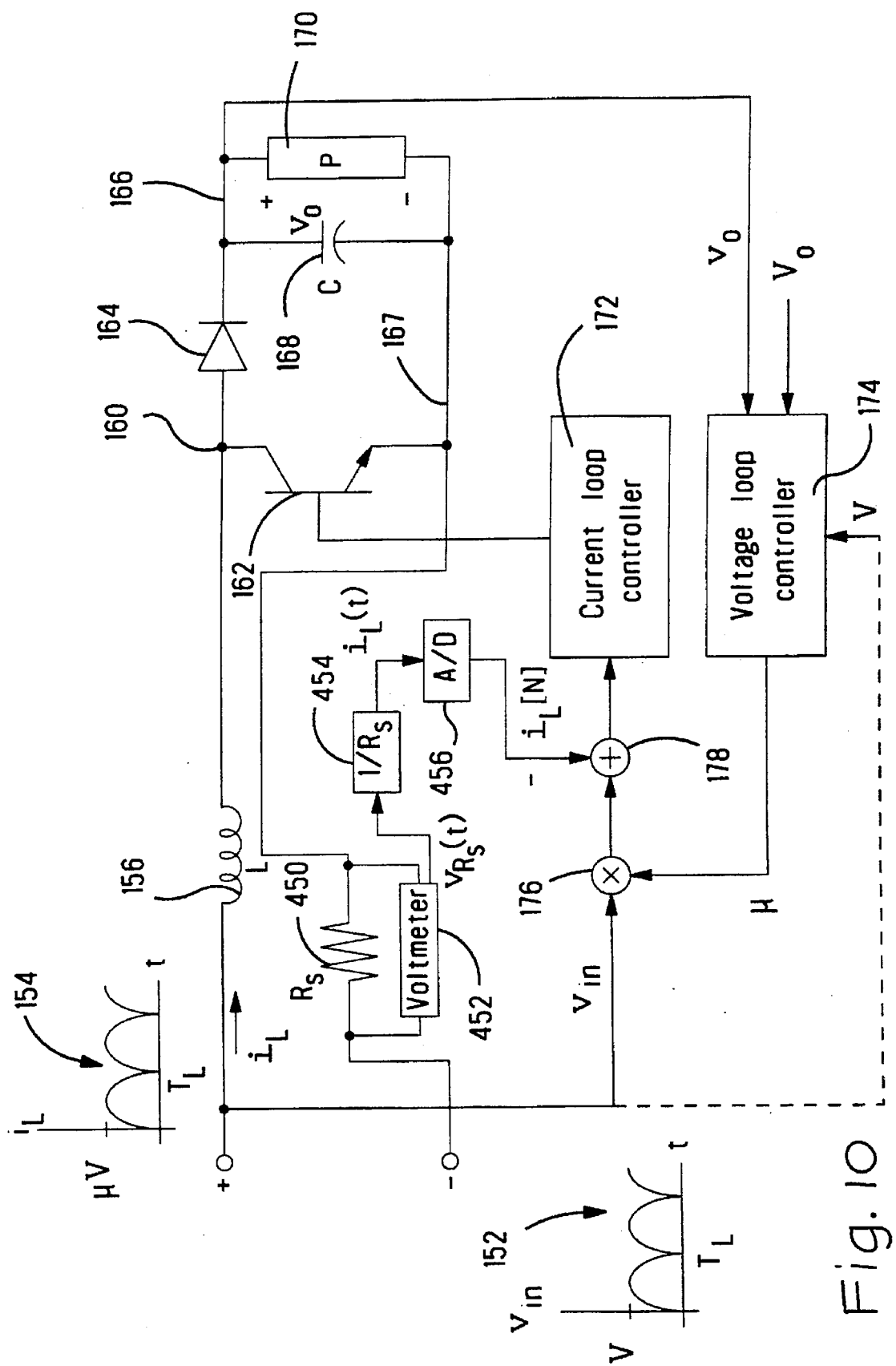
FIG. 10 is a diagrammatic depiction of an alternative embodiment of the load current sensing circuit of the present application.

FIG. 10 illustrates an alternative current sensing circuit to the LEM module 425. FIG. 10 is similar to FIG. 3, and only the differences will be discussed. The node 167 is connected to the current sensing resistor $R_s$ 450. A volt meter 452 is connected across the current sensing resistor $R_s$. The voltage across the current sensing resistor $R_s$ is output from the volt meter 452 to the scaler 454. The scaler 454 scales by the factor of $1/R_s$ to produce the load current $i_L(t)$, which is fed to the analog to digital converter 456. The digitized load current $i_L[N]$ is fed to the adder 178 from the A/D 456. The adder 178 adds the inverse of the load current $i_L[N]$ to the reference current $i_{ref}$.

Figure 11:
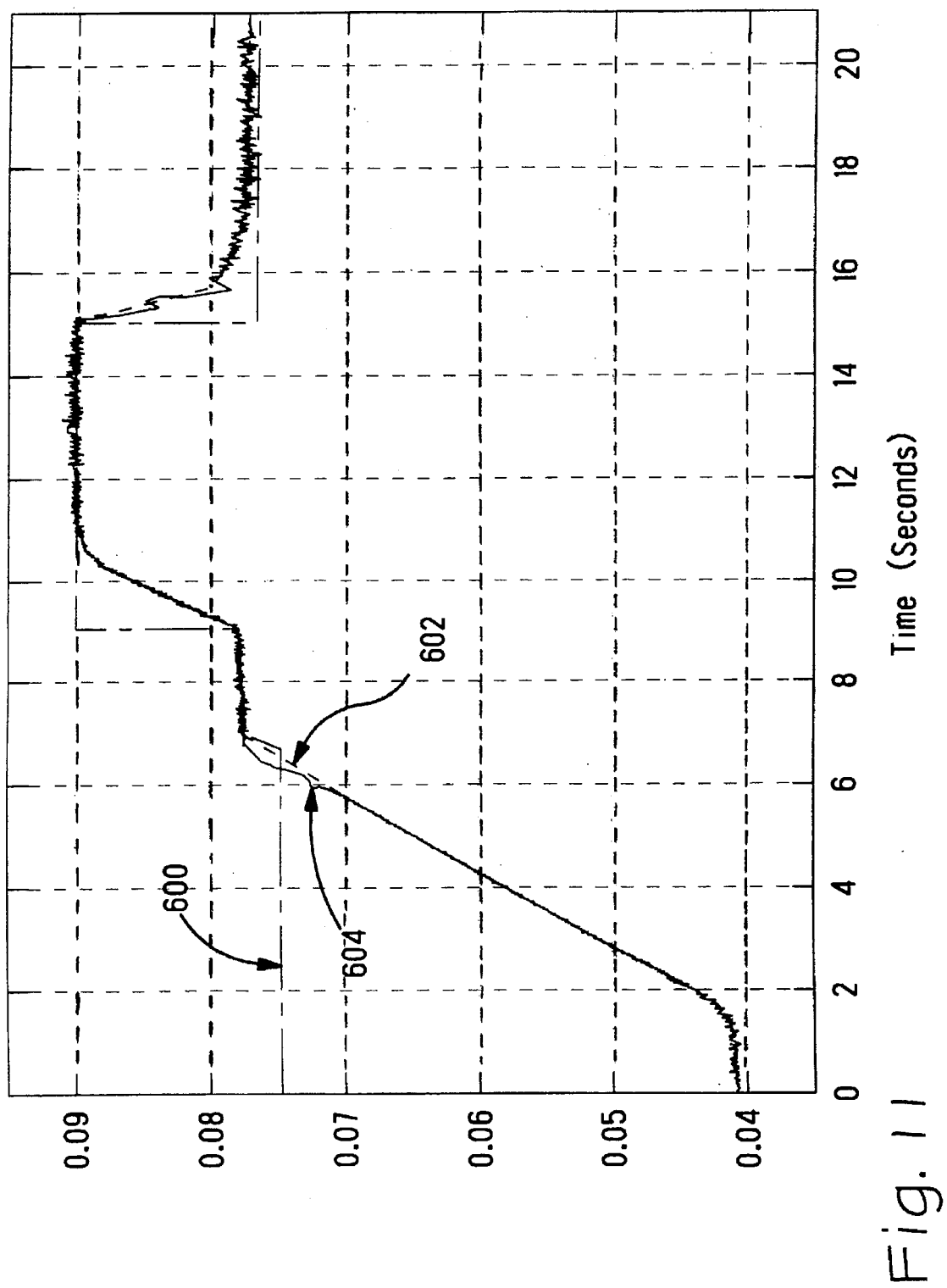
FIGS. 11–13 graph the response of the controller of the present application to various current charging profiles.
Figure 12:
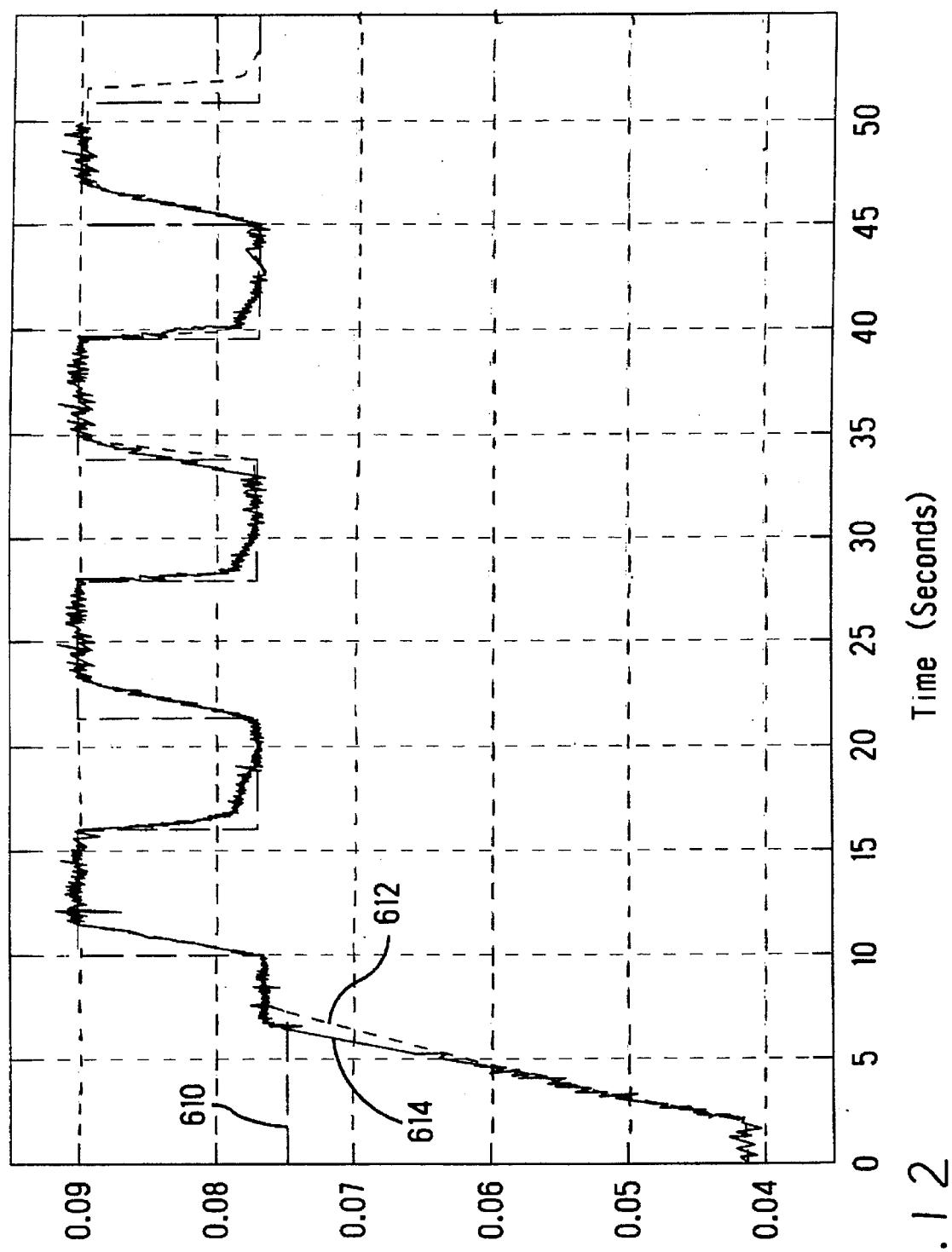
Figure 13:
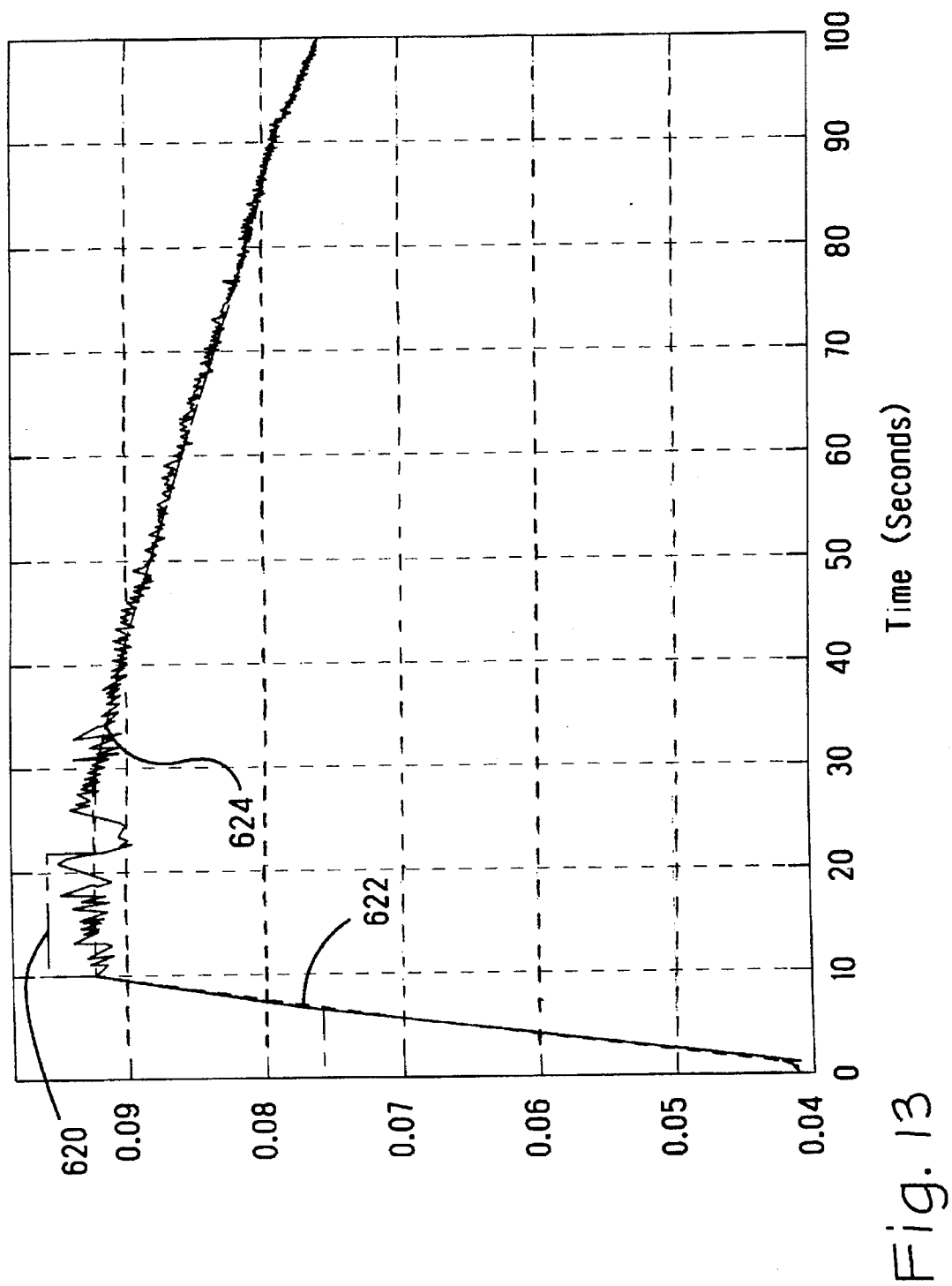

The complete system has been simulated using MATLAB for the gains obtained by pole placement for both the voltage and control loops. As shown in FIGS. 11, 12, and 13, the embodiment is able to match current profiles virtually exactly.

In FIG. 11, the desired current profile is the waveform 600, the simulated current from the power supply controller is the waveform 602, and the experimental result from the power supply controller is the waveform 604. Likewise, in FIG. 12, the desired profile is the waveform 610, the simulation is the waveform 612, and the experimental result is waveform 614. Similarly, in FIG. 13, the desired profile is the waveform 620, the simulation is the waveform 622, and the experimental result is the waveform 624.

FIG. 16 depicts an alternative embodiment of the power supply controller in which the temperature of the load, or alternatively the temperature of the ambient environment, is fed to the voltage controller 650 and to the current controller 652, for example, as a feedback signal. As a further alternative embodiment, the temperature can be fed to only one of either the voltage controller 650 or the current controller 652. Still other embodiments can make similar use of any measurable parameter of the load, such as internal pressure of a battery.

The predicted current profile tracking response matches the actual response for the large signal, linear, substantially unity power factor, power supply controller. Advantages of the controller include: a feed forward in the voltage loop, which makes the voltage controller dynamics independent of load; a current loop which operates in the time domain in such a way that the inner voltage loop is modeled by a unit time delay; and, the flexibility to incorporate any linear load into the current control state space description.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A large signal substantially unity power-factor controller for controlling a power supply, the power supply supplying a load thereto, comprising:

a large-signal feedforward digital voltage controller operating in a discrete time frame of units of n for controlling voltage output to the load which is resistive and at least one of inductive and capacitive, the voltage controller converging in Q*n cycles, where Q is an integer and $Q \geq 2$; and a current controller, operatively connected to the voltage controller, for controlling current output to the load operating in a discrete-time frame of units of N, where N=Q*n.

a feedforward parameter of the voltage controller being a function of scaled power to the load.

2. A power supply controller as in claim 1 wherein; the voltage controller operates as a unit delay for the current controller.

3. A power supply controller as in claim 1 wherein: the load includes a battery; and the power supply controller functions to recharge the battery.

4. A power supply controller as in claim 3, wherein: the battery is integrated within an electrically-powered car; and the connection between the power supply and the battery is an inductive coupling.

5. A power supply controller as in claim 1, wherein: the large-signal voltage controller is a feedforward and a proportional-integral controller.

6. A power supply controller as in claim 1, wherein: the current controller includes: a multiplying digital to analog converter.

7. A power supply controller as in claim 1, further comprising:

a load temperature sensor outputting a load temperature;

at least one of the large-signal voltage controller and the current controller controlling one of voltage and current, respectively, to the load also as a function of the load temperature.

8. A large signal substantially unity power-factor controller for controlling a power supply, the power supply supplying a load thereto, comprising:

a large-signal feedforward digital voltage controller for controlling voltage output to the load which is resistive and at least one of inductive and capacitive; and a current controller, operatively connected to the voltage controller, for controlling current output to the load operating in a discrete-time frame of units of N, where N=Q*n whereby:

the load draws a large signal range from the power supply controller; and the voltage controller includes:

a resolution mapping means, responsive to the large signal range drawn by the load, for selectively digitizing a small range of the large signal range; and a programmed microprocessor for selectively using one of an output of the resolution mapping means and a predetermined saturation value to determine a voltage control command.

9. A large signal substantially unity power-factor controller for controlling a power supply, the power supply supplying a load thereto, comprising:

a large-signal feedforward digital voltage controller for controlling voltage output to the load which is resistive and at least one of inductive and capacitive the voltage controller including:

a first squarer for squaring voltage on the load to form $v^2$;

a squarer for squaring a reference voltage to form $V^2$;

difference means for forming a difference $\Delta v$ between $V^2$ and $v^2$;

first scaling means for scaling the difference $\Delta v$ to form a scaled difference;

integrator means for integrating the difference $\Delta v$ to form an integrated difference; and an adder for adding the scaled difference and the integrated difference to form the first control command; and a current controller, operatively connected to the voltage controller, for controlling current output to the load operating in a discrete-time frame of units of N, where N=Q*n.

10. A power supply controller as in claim 9, wherein:

the voltage controller forms a control command k_tilde [n] according to $$k\_tilde[n] = \tilde{k}[n]$$

$$\tilde{k}[n] = \frac{C}{T_L V_2}(h_1(X[n] - x[n]) + h_2 \sigma_v[n]) + \frac{2}{V^2} P[n]$$

11. A large signal voltage controller for controlling a power supply, the power supply supplying a load voltage and load current to a load being resistive and at least one of inductive and capacitive comprising:

feedback means for determining an error $\Delta s$ between a first feedback parameter s from the load and a reference value S corresponding to the first feedback parameter s the error $\Delta s$ being determined as a function of a square $v^2$ of the load voltage and a square $V^2$ of a reference voltage; and final command means for determining a control command as a function of the error $\Delta s$ and at least one feedforward parameter which includes scaled power to the load.

12. A large signal voltage controller as in claim 11, further comprising:

a load temperature sensor for sensing load temperature;

the final control means determining the control command as a function of the error $\Delta s$ and the feedforward load power and load temperature.

13. A large signal voltage controller as in claim 11, wherein the feedback means includes:

a first squarer for squaring the load voltage to form $v^2$;

a squarer for squaring of the reference voltage $V^2$;

difference means for forming a difference $\Delta v$ between $V^2$ and $v^2$;

first scaling means for scaling the difference $\Delta v$ to form a scaled difference;

integrator means for integrating the difference $\Delta v$ to form an integrated difference; and an adder for adding the scaled difference and the integrated difference to form the first control command.

14. A large signal voltage controller as in claim 13, wherein:

the feedback means forms the control command k_tilde [n] according to $$k\_tilde[n] = \tilde{k}[n]$$

$$\tilde{k}[n] = \frac{C}{T_L V^2}(h_1(X[n] - x[n]) + h_2\sigma_v[n]) + \frac{2}{V^2} P[n].$$

15. A large-signal voltage controller as in claim 11, wherein:

the load includes a battery; and the controller functions to recharge the battery.

16. A large-signal voltage controller as in claim 15, wherein:

the battery is integrated within an electrically-powered car; and the connection between the power supply and the battery is an inductively coupling.

* * * * *